United States Patent
Li et al.

(10) Patent No.: US 11,373,205 B2
(45) Date of Patent: Jun. 28, 2022

(54) IDENTIFYING AND PUNISHING CHEATING TERMINALS THAT GENERATE INFLATED HIT RATES

(71) Applicant: Tencent Technology (Shenzhen) Company Limited, Guangdong (CN)

(72) Inventors: Dongyu Li, Guangdong (CN); Zuojie Peng, Guangdong (CN); Jie Liu, Guangdong (CN); Chunhui Wang, Guangdong (CN); Yu Sun, Guangdong (CN); Yiqun Li, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 514 days.

(21) Appl. No.: 15/989,997

(22) Filed: May 25, 2018

(65) Prior Publication Data
US 2018/0276709 A1 Sep. 27, 2018

Related U.S. Application Data

(63) Continuation of application No. PCT/CN2017/086126, filed on May 26, 2017.

(30) Foreign Application Priority Data

Jun. 2, 2016 (CN) .......................... 201610389956.4

(51) Int. Cl.
*G06Q 30/00* (2012.01)
*G06Q 30/02* (2012.01)

(52) U.S. Cl.
CPC ................ *G06Q 30/0248* (2013.01)

(58) Field of Classification Search
None
See application file for complete search history.

(56) References Cited

U.S. PATENT DOCUMENTS

| 8,245,282 B1 * | 8/2012 | Buckwalter | H04W 12/12 726/4 |
| 9,219,744 B2 * | 12/2015 | Baliga | H04L 63/1425 |
| 10,630,707 B1 * | 4/2020 | Oren | H04L 63/168 |

(Continued)

FOREIGN PATENT DOCUMENTS

| CN | 102663065 A | 9/2012 |
| CN | 103593415 A | 2/2014 |
| CN | 103714057 A | 4/2014 |
| CN | 104715395 A | 6/2015 |
| CN | 105046529 A | 11/2015 |

(Continued)

OTHER PUBLICATIONS

He et al., System Log Analysis for Anomaly Detection, 2016, IEEE, 27th International Symposium of Software Reliability Engineering, pp. 207-218 (Year: 2016).*

(Continued)

*Primary Examiner* — Naresh Vig
(74) *Attorney, Agent, or Firm* — Crowell & Moring LLP

(57) ABSTRACT

Embodiments of the present disclosure disclose an information processing method, a server, and a non-volatile storage medium. The method includes obtaining first log information in a first time period and then obtaining, based on the first log information, terminal information of a terminal that performs a hit behavior on a media information display place. The method includes determining, based on the terminal information, regional information corresponding to the terminal, where the regional information is used to indicate a region in which the terminal is located. The method also includes determining whether the number of regions in which the terminal is located is greater than a first threshold in a preset time range according to the regional information. The method further includes, when the number is greater than the first threshold, obtaining first terminal information of the terminal and determining that the terminal is an abnormal terminal.

17 Claims, 13 Drawing Sheets

(56) References Cited

U.S. PATENT DOCUMENTS

| | | | |
|---|---|---|---|
| 2008/0052629 A1 | 2/2008 | Phillips et al. | |
| 2008/0162200 A1* | 7/2008 | O'Sullivan | G06Q 30/04 |
| | | | 705/34 |
| 2008/0162202 A1* | 7/2008 | Khanna | G06Q 20/10 |
| | | | 705/14.47 |
| 2008/0201214 A1 | 8/2008 | Aaron et al. | |
| 2008/0281606 A1 | 11/2008 | Kitts | |
| 2008/0281941 A1 | 11/2008 | Park et al. | |
| 2010/0070620 A1* | 3/2010 | Awadallah | G06F 11/3485 |
| | | | 709/224 |
| 2011/0296009 A1* | 12/2011 | Baranov | G06Q 30/0248 |
| | | | 709/224 |
| 2013/0325591 A1* | 12/2013 | Delug | G06Q 30/0248 |
| | | | 705/14.45 |
| 2014/0149208 A1 | 5/2014 | Zwicky | |
| 2014/0156390 A1* | 6/2014 | Aaron | H04M 15/47 |
| | | | 705/14.47 |
| 2015/0178771 A1* | 6/2015 | Linden | G06Q 30/02 |
| | | | 705/14.47 |
| 2015/0262226 A1* | 9/2015 | Howe | H04L 67/306 |
| | | | 705/14.47 |
| 2016/0267529 A1* | 9/2016 | Jakobsson | G06Q 30/0277 |
| 2017/0336866 A1* | 11/2017 | Sato | G06F 3/04883 |

FOREIGN PATENT DOCUMENTS

| | | |
|---|---|---|
| CN | 106097000 A | 11/2016 |
| JP | 2007-286803 A | 11/2007 |
| JP | 2009-230524 A | 10/2009 |
| WO | WO 2016/119499 A1 | 8/2016 |

OTHER PUBLICATIONS

Valsamidis et al., A Clustering Methodology of Web Log Data for Learning Management Systems, 2012, Educational Technology & Society, 15(2), pp. 154-167 (Year: 2012).*

Edwards et al., Is that a bot running the social media feed, 2014, Computers in Human Behavior 33, pp. 372-376 (Year: 2014).*

Lividas et al., Using Machine Learning Techniques to Identify Botnet Traffic, 2006, IEEE (Year: 2006).*

Holz et al., Measurement and Mitigation of Peer-to-Peer-based Botnets, Apr. 9, 2008, www.usenix.org (Year: 2008).*

Faou et al., "Follow the traffic: stopping click fraud by disrupting the value chain", Dec. 1, 2016, IEEE, 14th annual conference and privacy, security and trust (PST), pp. 464-476 (Year: 2016).*

How criminals profit, 2012, John Wiley & Sons, Inc., The Death of the Internet, First Edition, pp. 19-55 (Year: 2012).*

Kitts et al. published article "Click fraud detection with bot signatures", 2013, IEEE, ISI 2013 pp. 146-150 (Year: 2013).*

Faou et al. published article "Follow the traffic: stopping click fraud by disrupting the value chain", Dec. 1, 2016, IEEE Xplore, 2016 14th annual conference on privacy, security and trust (PST), pp. 464-476 (Year: 2016).*

European Office Action dated Jul. 10, 2020 on European Application 17805756.8, 8 pages.

Perera, et al. "A Novel Ensemble Learning-Based Approach for Click Fraud Detection in Mobile Advertising", International Conference on Computer Analysis of Images, Dec. 18, 2013, 12 pages.

Stone-Gross, Brett et al., "Understanding Fraudulent Activities in Online Ad Exchanges," Proceedings of the 2011 ACM SIGCOMM conference on Internet measurement Conference, Nov. 4, 2011, pp. 279-294.

Office Action dated Sep. 25, 2019 for Chinese Application No. 201610389956.4 with concise English Translation, 9 pages.

International Search Report and Written Opinion (with English Translation) dated Sep. 1, 2017 for PCT Application No. PCT/CN2017/086126, 19 pages.

Office Action (with English Translation) dated May 20, 2019 for Japanese Application No. 2018-527752, 6 pages.

* cited by examiner

IDENTIFYING AND PUNISHING CHEATING TERMINALS THAT GENERATE INFLATED HIT RATES

RELATED APPLICATION

The application is a continuation application of PCT Patent Application No. PCT/CN2017/086126, filed on May 26, 2017, which claims priority to Chinese Patent Application No. 201610389956.4, filed with the Chinese Patent Office on Jun. 2, 2016, both of which are incorporated herein by reference in their entireties.

FIELD OF THE TECHNOLOGY

The present disclosure relates to the information processing technologies, and specifically, to an information processing method, a server, and a non-volatile storage medium.

BACKGROUND OF THE DISCLOSURE

During display of media information (for example, an advertisement) of mobile terminals, for obtaining economic benefits, the means of cheating continuously escalate as anti-cheating means develop. To obtain more income, a cheating party needs to report more hit rates, for which a direct method is to forge new users. A currently known method for cheating mainly includes the following types. First, terminal information is forged by a technical means, for example, the information of the terminal includes an international mobile equipment identity (IMEI) or an Android ID in an Android system, or an Identifier for Advertising (IDFA) or a Media Access Control (MAC) address in an iOS system. By means of forged terminal information, one mobile terminal may be recognized as a plurality of terminals. Second, almost all Internet Protocol (IP) resources are obtained by technical means. Third, hit behaviors of users are implemented by hit simulation technologies.

In this way, by the three technical means described above and a combination thereof, cheating users cannot be accurately detected and recognized by using the existing anti-cheating detection policy. Consequently, a hit rate of a media information display place cannot be accurately collected through statistics. However, there is no effective solution to this problem in related technologies.

SUMMARY

The present disclosure addresses the above-identified problems with existing technology where cheating to obtain inflated hit rates cannot be accurately detected. The present disclosure improves the computer and internet related technologies, specifically, the information processing technologies.

Embodiments of the present disclosure aim to provide an information processing method, a server, and a non-volatile storage medium, to resolve a problem in the existing technology that cheating users cannot be accurately detected and recognized by a technical means for cheating that is displayed in media information.

To achieve the foregoing objective, the technical solutions of the embodiments of the present disclosure are implemented as follows:

An embodiment of the present disclosure provides an information processing method. The method includes obtaining, by a device comprising a memory and a processor in communication with the memory, first log information of a media information advertising system in a first time period. The method also includes obtaining, by the device based on the first log information, terminal information of a terminal that performs a hit behavior on a media information display place. The method includes determining, by the device based on the terminal information, regional information corresponding to the terminal, wherein the regional information is used to indicate at least one region in which the terminal is located. The method includes determining, by the device, whether a number of regions is greater than a first threshold in a preset time range. When it is determined that the number of regions is greater than the first threshold in the preset time range, the method further includes obtaining, by the device, first terminal information of the terminal, and determining, by the device, that the terminal is an abnormal terminal.

An embodiment of the present disclosure further provides a server. The server includes a memory storing instructions and a processor in communicating with the memory. When the processor executes the instructions, the instructions are configured to cause the server to obtain first log information of a media information advertising system in a first time period and obtain, based on the first log information, terminal information of a terminal that performs a hit behavior on a media information display place. When the processor executes the instructions, the instructions are configured to cause the server to determine, based on the terminal information, regional information corresponding to the terminal, wherein the regional information is used to indicate at least one region in which the terminal is located. When the processor executes the instructions, the instructions are configured to cause the server to determine whether a number of regions is greater than a first threshold in a preset time range. When it is determined that the number of regions is greater than the first threshold in the preset time range, the instructions are further configured to cause the server to obtain first terminal information of the terminal, and determine that the terminal is an abnormal terminal.

An embodiment of the present disclosure further provides a non-transitory computer readable storage medium storing instructions. The instructions, when executed by a processor, cause the processor to perform obtaining first log information of a media information advertising system in a first time period and obtaining, based on the first log information, terminal information of a terminal that performs a hit behavior on a media information display place. The instructions, when executed by a processor, cause the processor to perform determining, based on the terminal information, regional information corresponding to the terminal, wherein the regional information is used to indicate at least one region in which the terminal is located. The instructions, when executed by a processor, also cause the processor to perform determining whether a number of regions is greater than a first threshold in a preset time range. The instructions, when executed by a processor, further cause the processor to perform, when it is determined that the number of regions is greater than the first threshold in the preset time range, obtaining first terminal information of the terminal, and determining that the terminal is an abnormal terminal.

According to the information processing method, the server, and the non-volatile storage medium provided in the embodiments of the present disclosure, the method includes obtaining first log information in a first time period and obtaining, based on the first log information, terminal information of a terminal that performs a hit behavior on a media information display place. The method includes determining, based on the terminal information, regional information corresponding to the terminal, where the regional information is used to indicate a region in which the terminal is located. The method also includes determining whether the number of regions in which the terminal is located is greater than a first threshold in a preset time range according to the regional information. The method further includes obtaining, based on a determining result, first terminal information of which the corresponding number of regions is greater than the first threshold, and determining that a terminal corresponding to the first terminal information is an abnormal terminal. By means of the embodiments of the present disclosure, information about a terminal that performs a hit behavior on a media information display place and corresponding regional information are analyzed, and a terminal whose number of regions is greater than a first threshold is determined to be an abnormal terminal. Therefore, a problem in the existing technology that cheating users could not be accurately detected and recognized by a technical means for cheating is resolved, and an accuracy rate of a hit rate of the media information display place is greatly improved.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

The following further describes the present disclosure in detail with reference to the accompanying drawings and specific embodiments.

Figure 1:
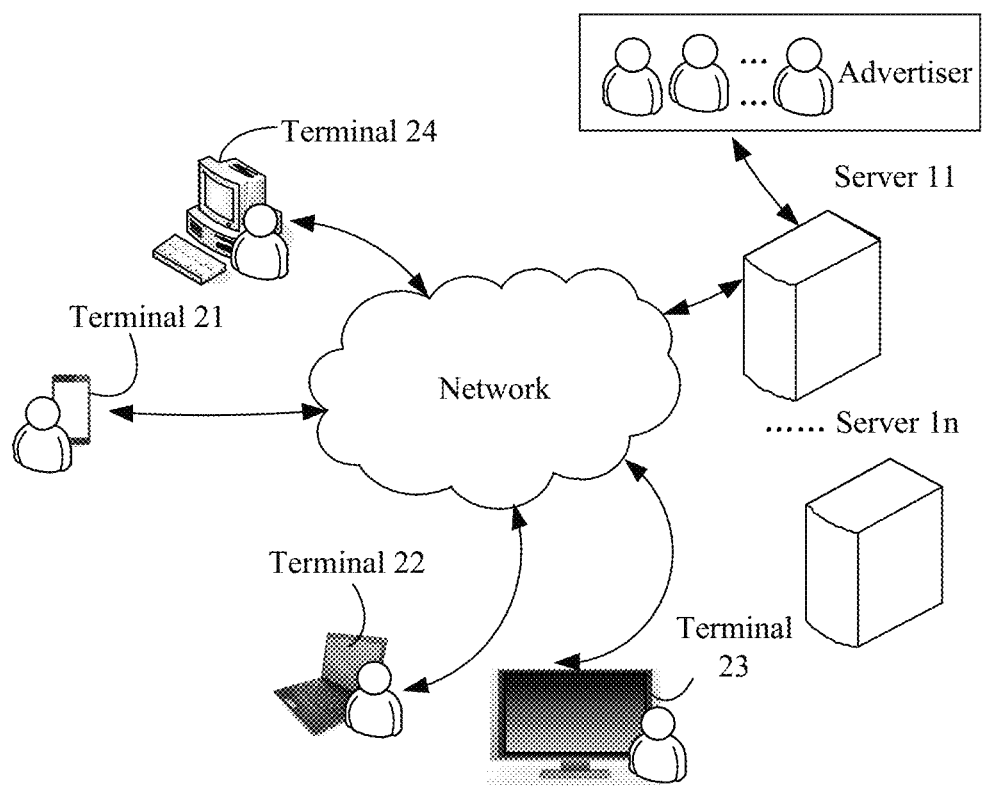
FIG. 1 is a schematic diagram of hardware entities of all parties that perform information exchange according to an embodiment of the present disclosure.

FIG. 1 is a schematic diagram of hardware entities of parties that perform information exchange according to embodiments of the present disclosure. FIG. 1 includes servers 11, . . . 1n and terminal devices 21 to 24. The terminal devices 21 to 24 perform information exchange with the servers by using either a wired network or a wireless network. The terminal device may include types such as a mobile phone, a desktop computer, a personal computer, and an all-in-one machine. In an example, the server may interact with a first-type terminal by using a network. The first-type terminal may be, for example, a terminal of an advertiser, or may be referred to as an object that provides advertisement materials and content promotion. After the first-type terminal submits a to-be-advertised advertisement, the advertisement is stored in a server or a server cluster. A skilled person may be provided to perform a series of processing such as verifying the to-be-advertised advertisement advertised by the first-type terminal. The terminal devices 21 to 24 may be referred to as a second-type terminal. The second-type terminal may be, for example, a terminal of a normal user, or may be referred to as an object or audience for advertisement display or exposure. The second-type terminal may be, for example, a user that views a video by using a video application, or a user that uses a social application. Advertisements may be added to all applications or specified applications (for example, a game application, a video application, and a navigation application) installed on the terminal device, to display recommended information for the user.

In the embodiments, the server includes two types of servers. The first-type server is configured to provide advertising traffic for media information advertisement, and is referred to as an advertising traffic provider in the embodiments. The first-type terminal (for example, a terminal of an advertiser) needs to purchase traffic from the first-type server (for example, the advertising traffic provider), to advertise media information using the purchased advertising traffic. The second-type server is configured to perform cheating detection on the foregoing behaviors, to prevent the advertising traffic provider from increasing a hit rate of the media information by cheating and thus damaging the interest of the advertiser. The information processing method in the embodiments is applied to the second-type server or the server cluster.

Embodiment 1

Figure 2:
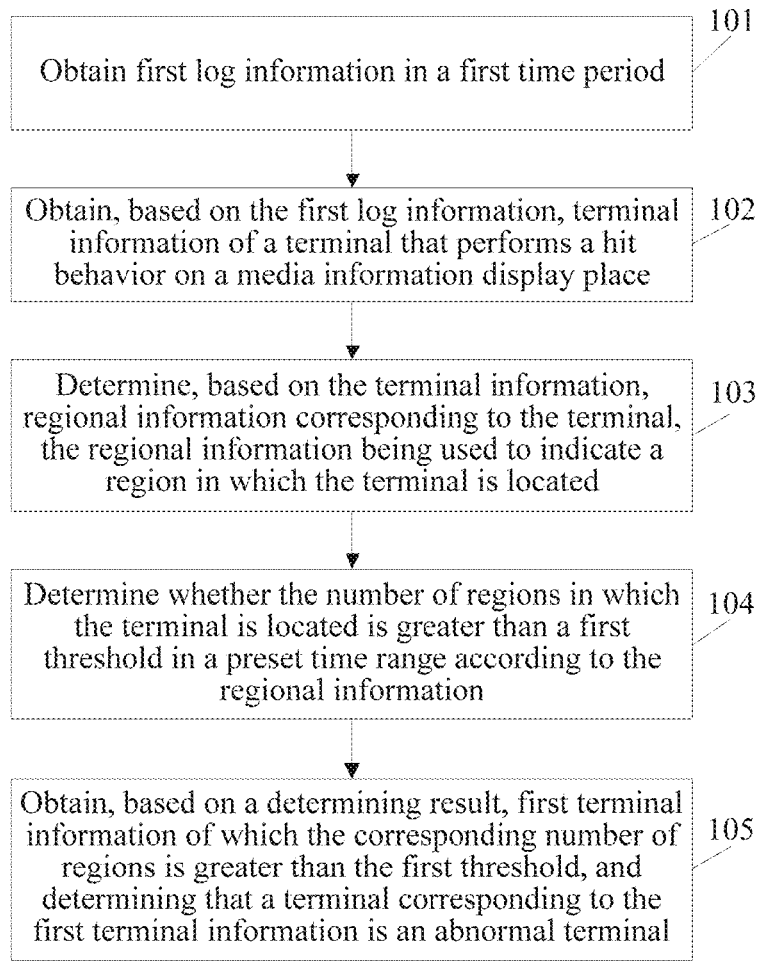
FIG. 2 is a first schematic flowchart of an information processing method according to an embodiment of the present disclosure.

This embodiment of the present disclosure provides an information processing method. FIG. 2 is a first schematic flowchart of the information processing method according to this embodiment of the present disclosure. As shown in FIG. 1, the method includes:

Step 101: Obtain first log information in a first time period.

Figure 7A:
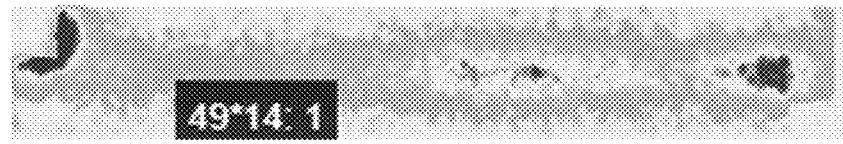
FIG. 7A to FIG. 7C are a schematic diagram of distribution of hit positions on the media information display place.

Step 102: Obtain, based on the first log information, terminal information of a terminal that performs a hit behavior on a media information display place. The media information display place may be a place on a display screen of the terminal for displaying media information. The media information may be information corresponding to the advertisement. FIG. 7A shows an example of hit positions on the media information displace place.

Step 103: Determine, based on the terminal information, regional information corresponding to the terminal, the regional information being used to indicate a region in which the terminal is located. In another embodiment, the regional information may be used to indicate a plurality of regions where the terminal is located.

Step 104: Determine whether the number of regions in which the terminal is located is greater than a first threshold in a preset time range according to the regional information.

Step 105: Obtain, based on a determining result, first terminal information of which the corresponding number of regions is greater than the first threshold, and determining that a terminal corresponding to the first terminal information is an abnormal terminal. In another embodiment, when it is determined that the number of regions in which the terminal is located is greater than the first threshold in the preset time range according to the regional information, determine the terminal is an abnormal terminal.

The information processing method in this embodiment of the present disclosure is applied to a media information advertising system. Content of the media information may be, for example, content of an advertisement.

The information processing method in this embodiment is mainly for a technical means for cheating in the existing technology for forging users. In the existing technology, users are forged mainly in a combined manner of changing an IP address and changing terminal information. The terminal information may include an IMEI. The dimensions of the IMEI and the IP address are discrete when the IMEI and the IP address are considered separately. In another embodiment, when the IMEI and the IP address are considered separately, neither the IMEI nor the IP address has any correlation or pattern. When the IP address corresponds to a region in which a terminal is located (the region may be accurate to a municipal-level, a city-level, a county-level, or the like). However, when the IMEI and the IP address are considered in a combined manner in a normal case, within a short period of time (for example, one hour), a normal terminal is located within a particular region, and it is a small probability event that the terminal appears in a plurality of regions within the short period of time. Therefore, in a case that some IMEIs correspond to a plurality of regions within a short period of time, terminals corresponding to the IMEIs may be forged terminals.

Table 1 shows a distribution status of regions in which all IMEIs in a media information advertising platform occur in one hour. As shown by the collected statistics, approximately 97% of IMEIs only occur in one region, a small amount of IMEIs, approximately 2%, occur in two regions, and less than 1% of IMEIs occur in at least two regions within one hour. One IMEI occurs in up to 261 different regions (not shown).

TABLE 1

| Number of occurred regions | Number of IMEIs | Percentage |
|---|---|---|
| Equal to 1 | 513457 | 97.78% |
| Equal to 2 | 10530 | 2.00% |
| Greater than 2 | 1127 | 0.22% |

It may be seen that within an hour, there is a very small probability, approximately 0.22%, that one IMEI occurs in more than two regions. It may be considered that within a preset time range (for example, one hour) if the number of regions in which one piece of terminal information occurs is greater than a first threshold, it may be determined that the terminal information is forged in combination with changing an IP address, and the corresponding terminal is an abnormal terminal. In one embodiment, the first threshold may be 2. In another embodiment, terminal information and corresponding regional information in a media information pushing platform are obtained, and the regional information may be specifically represented as a municipal-level region range. When the number of regions corresponding to the first terminal information in a time range less than a preset time range (for example, one hour) is greater than the first threshold (for example, 3), it may be determined that a first terminal corresponding to the first terminal information is an abnormal terminal.

In one embodiment, the first log information is log information in a relatively short time range. In an implementation, the first log information may be hour-level log information, for example, one-hour log information. Certainly, the first log information is not limited to the hour-level log information, and may be minute-level log information. The first log information includes all information obtained by a media information pushing platform, which includes a hit behavior on a media information display place, terminal information, user the information, and information about a position at which a terminal is located.

In the present disclosure, information about a terminal that performs a hit behavior on a media information display place and corresponding regional information are analyzed, and a terminal whose number of regions is greater than a first threshold is determined to be an abnormal terminal. Therefore, a problem in the existing technology that cheating users cannot be accurately detected and recognized is resolved, and an accuracy rate of a hit rate of the media information display place is greatly improved. On the other hand, the interests of a media information advertising party (for example, an advertiser) are protected.

Embodiment 2

Figure 3:
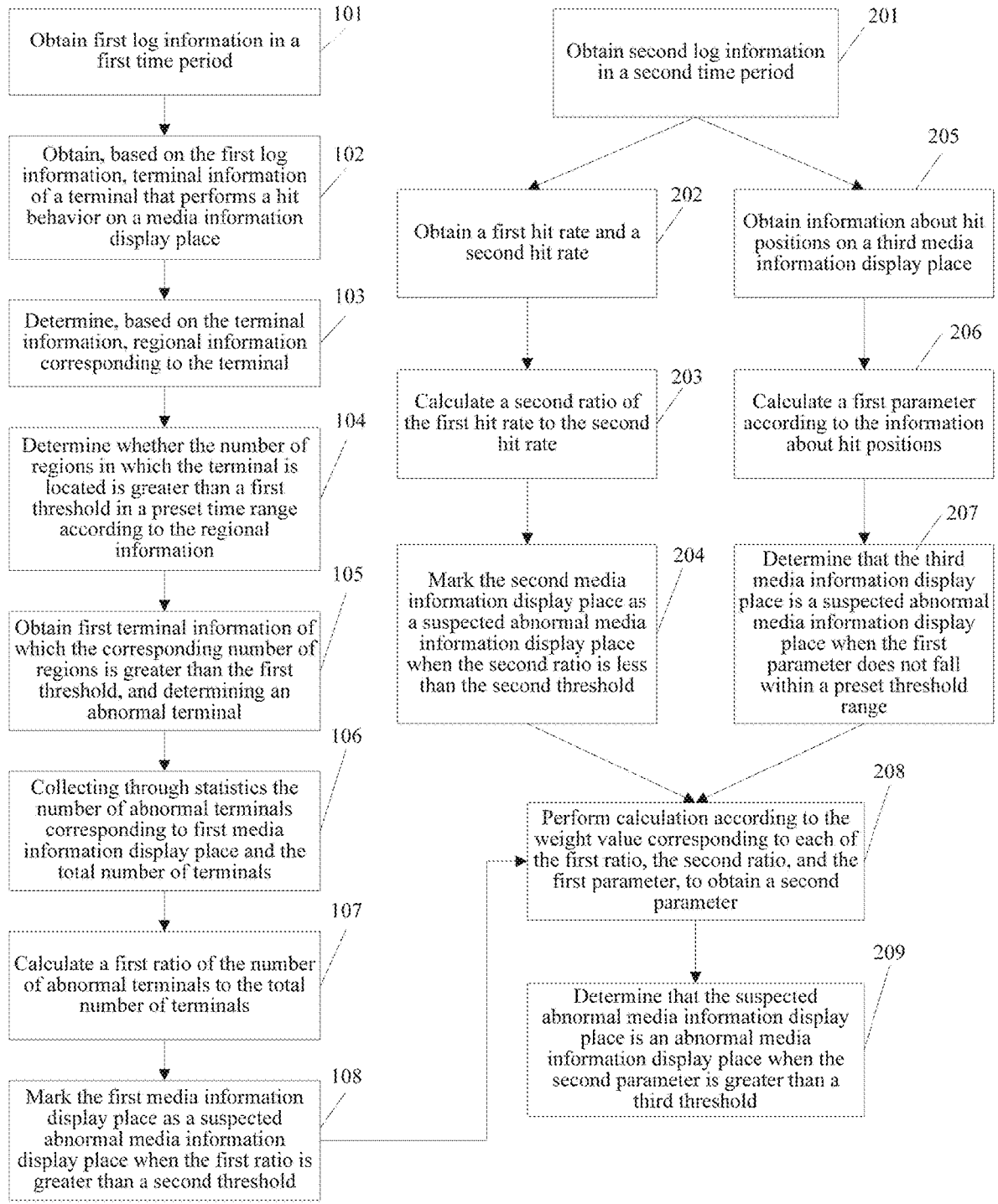
FIG. 3 is a second schematic flowchart of an information processing method according to an embodiment of the present disclosure.

This embodiment of the present disclosure further provides an information processing method. Based on the information processing solution in Embodiment 1, based on a recognized abnormal terminal, and with reference to second log information having a relatively long time range, the information processing solution in this embodiment is mainly used for recognizing an abnormal media information display place. FIG. 3 is a second schematic flowchart of the information processing method according to this embodiment of the present disclosure. As shown in FIG. 3, in additional to steps 101-105, the information processing method may further include the following steps:

Step 106: Collecting through statistics the number of abnormal terminals corresponding to first media information display place and the total number of terminals in the media information display place corresponding to the abnormal terminal, where the first media information display place is any of the media information display place corresponding to the abnormal terminal.

Step 107: Calculate a first ratio of the number of abnormal terminals to the total number of terminals.

Step 108: When the first ratio is greater than a second threshold, mark the first media information display place as a suspected abnormal media information display place, and further perform step 208. In another embodiment, when the first ratio is greater than a second threshold, the first media information display place is determined or labeled as a suspected abnormal media information display place, and step 208 is further performed.

Step 201: Obtain second log information in a second time period, where a time range of the second time period may be greater than a time range of the first time period. In another word, the second time period may be longer than the first time period.

Step 202: Obtain a first hit rate of second media information display place in a first preset time range and a second hit rate of the second media information display place in a second preset time range based on the second log information, where the first preset time range and the second preset time range may be different. Specifically, the first preset time range may be used for representing a time range during the day; and the second preset time range may be used for representing a time range during the night.

Step 203: Calculate a second ratio of the first hit rate to the second hit rate.

Step 204: Mark the second media information display place as a suspected abnormal media information display place when the second ratio is greater than the second threshold, and further perform step 208.

Step 205: Obtain, based on the second log information, information about hit positions on a third media information display place.

Step 206: Calculate a first parameter according to the information about hit positions, where the first parameter indicates a distribution status of the hit positions on the third media information display place.

Step 207: Determine that the third media information display place is a suspected abnormal media information display place when the first parameter does not fall within a preset threshold range, and further perform step 208.

Step 208: Perform calculation according to the weight value corresponding to each of the first ratio, the second ratio, and the first parameter, to obtain a second parameter corresponding to the suspected abnormal media information display place.

Step 209: Determine that the suspected abnormal media information display place is an abnormal media information display place when the second parameter is greater than a third threshold.

In this embodiment, a final objective of analyzing cheating of a advertising traffic provider is to obtain a higher amount of advertising fee of a media information advertiser (for example, an advertiser). Therefore, most traffic parties will increase the hit rate of media information to the greatest extent by a cheating means. Manifestation of a hit behavior of media information by using a cheating technology is different from manifestation of a hit behavior of normal media information. A first difference lies in that, to maximize the benefits, the advertising traffic provider will hit the media information regardless of day and night. This is contrast to a normal behavior.

Figure 4:
FIG. 4 is a schematic curve of a normal hit rate of a media information display place according to an embodiment of the present disclosure.

FIG. 4 is a schematic diagram of a curve of a normal hit rate of a media information display place according to an embodiment of the present disclosure. As shown in FIG. 4, it may be seen that between about 2 o'clock and about 6 o'clock in the morning, the number of hit of the media information display place is relatively small, and from about 8 o'clock in the morning, the number of hit behaviors of the media information display place gradually increases to the highest level. At about 23 o'clock in the night, the number of hit behaviors of the media information display place falls. It may be seen that the hit behavior on the media information display place is related to a time table of the user. During the day, the user is not in a sleeping state, and a probability that the user generates a hit behavior on the media information display place is far greater than a probability that the user generates a hit behavior on the media information display place in the night.

Based on this, when the hit behavior on the media information display place does not have a distinctive pattern during the day and the night as shown in FIG. 3, and hit behaviors are generated regardless of the day and the night, this will be considered as a small probability event from the perspective of statistics.

Figure 5A:
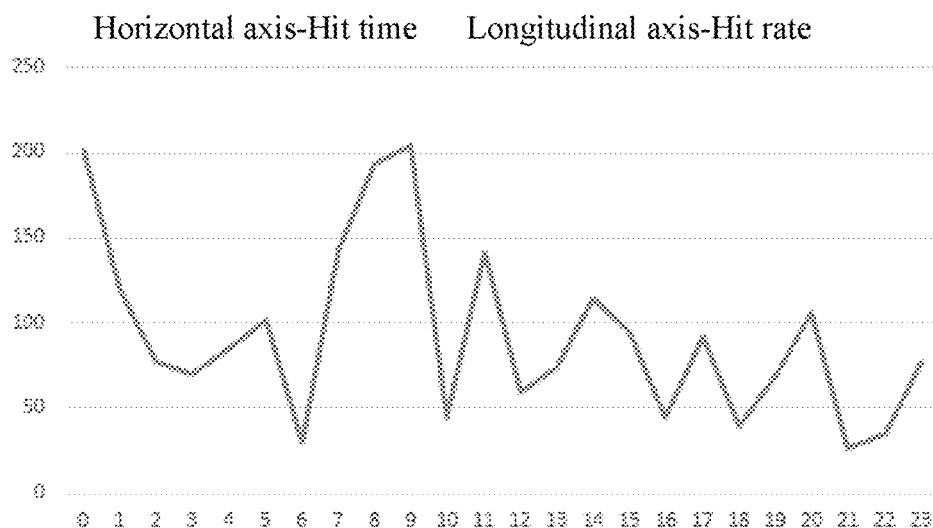
FIG. 5A and FIG. 5B each are a schematic diagram of an abnormal hit rate of a media information display place according to an embodiment of the present disclosure.
Figure 5B:
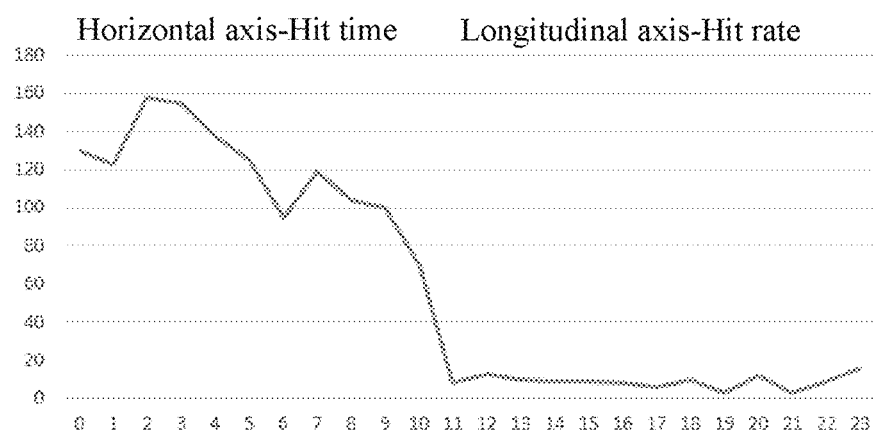

For examples, FIG. 5A and FIG. 5B each are a schematic diagram of an abnormal hit rate of a media information display place according to an embodiment of the present disclosure. It may be seen that rules of the schematic curves of the abnormal hit rates shown in FIG. 5A and FIG. 5B are different from a normal hit rate of the media information display place shown in FIG. 4. Specifically, as shown in FIG. 5A, although a hit rate of the media information display place fluctuates, the hit rate does not have a distinctive pattern during the day and the night, and it may be considered that during the time of one day, the hit rates of the media information display place are evenly distributed. As shown in FIG. 5B, the hit rates of the media information display place are all at relatively high values after 0 o'clock in the night and before about 7 o'clock in the morning, and gradually decrease after about 7 o'clock in the morning and are close to a lowest level at about 11 o'clock in the morning. This is inconsistent with distribution of normal hit behaviors of the media information display place shown in FIG. 4. From this, it may be considered that the hit behaviors generated on the media information display place are manually intervened, and have a suspicion of cheating.

Figure 6:
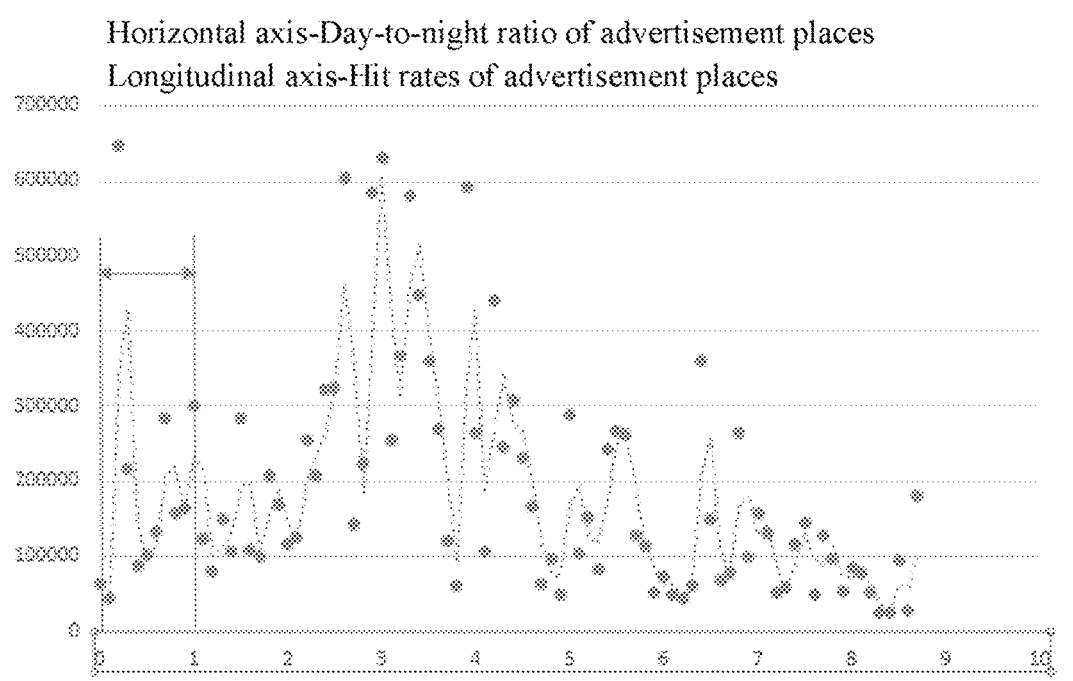
FIG. 6 is a scatter chart of distribution of a day-to-night ratio of a hit rate of a media information display place according to an embodiment of the present disclosure.

According to a distribution rule of normal hit behaviors on the media information display place shown in FIG. 4, in step 202 to step 204 in this embodiment, several representative time period may be selected to represent day and night. For example, "night" (a sleeping time period of a user) may be defined as a time period from 0 o'clock in the night to 8 o'clock in the morning, but "day" (an awake time period of a user) may be defined as a time period from 8 o'clock in the morning to 0 o'clock in the night. Certainly, in this embodiment, "day" may be a first preset time range, the first preset time range indicates a time period in which a user is in an awake state; "night" maybe a second preset time range, and the second time range indicates a time period in which a user is in a sleeping state. In this embodiment, a first hit rate of the second media information display place in the first preset time range and the second hit rate of the second media information display place in the second preset time range are collected through statistics. The second media information display place is any media information display place in a media information pushing platform. A second ratio of the first hit rate to the second hit rate is calculated. When the second ratio is less than a second threshold, it is determined that the second media information display place is a suspected abnormal media information display place. The second threshold may be a value less than or equal to 1. When the second ratio is less than the second threshold, the hit rate of the second media information display place during the "day" is less than the hit rate of the second media information display place during the "night". Specifically, as shown in FIG. 6, the part whose horizontal coordinate is less than 1 is an advertisement place that is more active in the night than in the day. The vertical coordinate represents the number of advertisement places. It may be seen that some advertisement places are active in the night. Except some special applications, a large part of advertisement places with horizontal coordinate less than 1 are cheating advertisement places.

In this embodiment, a second difference lies in that, the position of a media information display place hit by each user is reported by using a software development kit (SDK), and a service end collects through statistics a distribution status of a hit coordinate of each media information display place. It may be found though statistics and analysis that, distribution of hit positions on the media information display place by a cheating means is different from that of a normal media information display place.

Figure 7B:
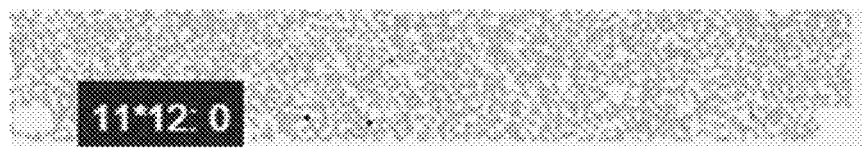
Figure 7C:
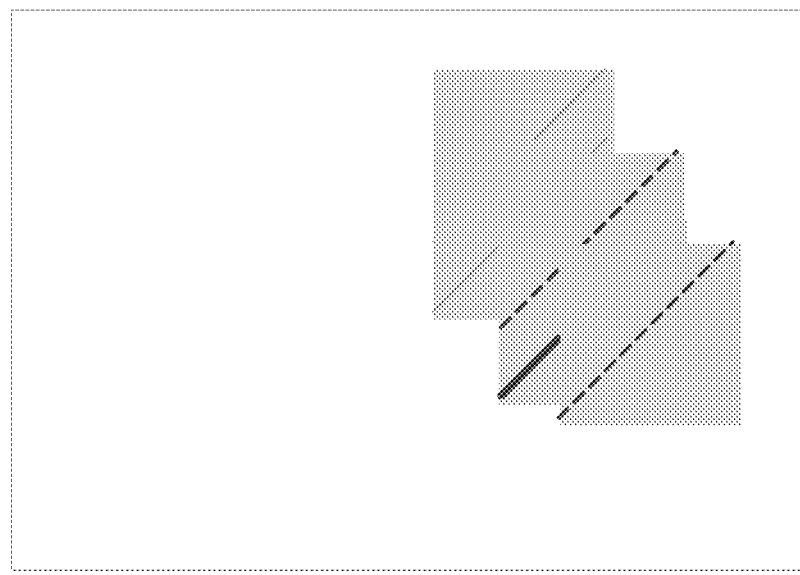

For example and not limited to, FIG. 7A to FIG. 7C are schematic diagrams of distribution of hit positions on a media information display place. FIG. 7A is a schematic diagram of distribution of hit positions on a normal media information display place. As shown in FIG. 7A, the hit positions of the normal media information display place are distributed according to the format and content of media information that have particular hotspots. For example, coordinates of the media information display place in some regions are in scattered point distribution; and the media information display place in some regions are more focused by the user, and coordinates thereof are in concentration distribution. Distribution of hit positions of abnormal media information display places may be shown in FIG. 7B and FIG. 7C. Because hit behaviors on the media information display place by a cheating means may be generated in a programmed fixed mode, and hit positions thereof present a particular rule. By means of data analysis, hit position of abnormal media information display places usually present scattered point distribution or concentration distribution. For details, refer to FIG. 7B and FIG. 7C separately. FIG. 7B represents hit positions in scattered point distribution. FIG. 7C represents hit positions in concentration distribution. The boldness degree or line type of lines in FIG. 7C indicate different hit rates. The line type may include a solid line or a dashed line. For example, a thin solid line indicates a hit rate, a bold solid line indicates a second hit rate, and a dashed line indicates a third hit rate.

Based on the foregoing description, in step 205 to step 207 in this embodiment, a first parameter is calculated according to hit position information of the third media information display place, the first parameter indicates a distribution status of hit position of the third media information display place; and when the first parameter does not meet a preset condition, it is determined that the third media information display place is a suspected abnormal media information display place. The first parameter may be represented by using an entropy value, that is, the media information display place of the media information is recognized by using an entropy algorithm.

Specifically, for a case in which hit positions of abnormal media information display places are in scattered point distribution, as shown in FIG. 7B, coordinate points are evenly distributed in a horizontal direction and a vertical direction. Therefore, when the coordinate points in the horizontal direction or the vertical direction are evenly distributed, it can be recognized that the hit positions are in scattered point distribution so that hit positions of the media information display place are abnormal. Given interval ranges of the horizontal direction and the vertical direction, a maximal entropy value may be obtained in even distribution. Evenness of distribution of hit is described by using an entropy value. For example, in the horizontal direction, a calculation method is as follows:

$$H(x) = -\Sigma p(x)\log(p(x)) \quad (1)$$

x represents a horizontal coordinate of a hit position; p (x) represents a probability when the horizontal coordinate of the hit position is x; and H (x) represents an entropy value of hit positions on the media information display place.

On the other hand, for a case in which hit positions of abnormal media information display place are in concentration distribution, as shown in FIG. 7C, when the value of a horizontal coordinate x is fixed, selectivity of the value of a longitudinal coordinate y is small. That is, given a horizontal coordinate x, the uncertainty of the longitudinal coordinate y is relatively small. Therefore, this may be represented by using condition entropy. Details are as follows:

$$H(Y \mid X) = -\sum p(x, y)\log\frac{p(x, y)}{p(x)} = \sum p(x, y)\log\frac{p(x)}{p(x, y)} \quad (2)$$

x and y respectively represent a horizontal coordinate and a longitudinal coordinate of a hit position; p (x) represents a probability when the horizontal coordinate of the hit position is x; p (x, y) represents a probability when the horizontal coordinate of the hit position is x, and the longitudinal coordinate is y; and H (Y|X) represents an entropy value of hit positions on the media information display place.

Based on the foregoing entropy calculation method, a first parameter is calculated for hit positions on each media information display place. The first parameter may be specifically entropy. For different types of media information display places, for example but not limited to, a banner and a table plaque, corresponding preset threshold ranges for different types may be respectively set. When the first parameter of the calculated media information display place (for example, the entropy) does not fall within the preset threshold range, it may be determined that the media information display place is a suspected abnormal media information display place. For example, for a table plaque advertisement place, when entropy is approximately or greater than a certain number (for example but not limited to, a 8-bit number, i.e., at least 128), it may be considered that the entropy represents even distribution in case, and has a cheating suspicion. That is, it may be determined that the table plaque advertisement place is a suspected abnormal media information display place.

Figure 8:
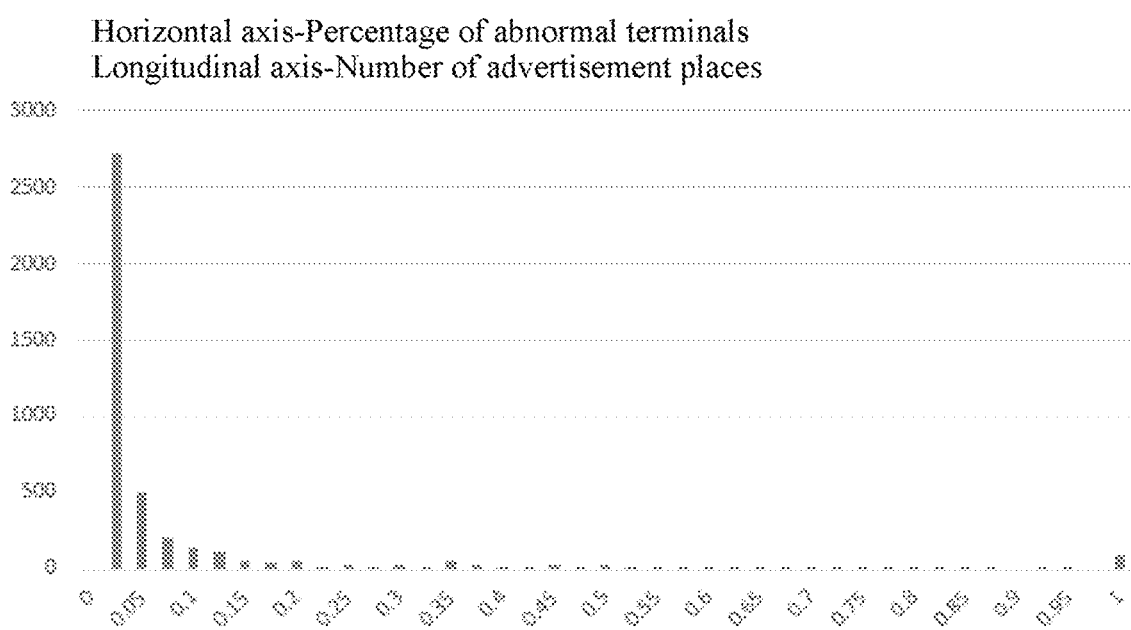
FIG. 8 is a schematic diagram of a proportional relationship between a percentage of abnormal terminals and the number of advertisement places according to an embodiment of the present disclosure.

In this embodiment, a third difference lies in that, for an abnormal terminal recognized in Embodiment 1, assuming that an advertisement place has 100 hits each day, and 10% of the hits are by such an IMEI, a probability of the occurrence of the event may be roughly estimated according to the following formula: $P=(0.0022)^{10} \times (0.9978)^{90}$. P is a value that is very close to 0, and indicates that such a case is an extremely small probability event. Whenin traffic of an advertisement place, there are a large number of IMEIs that occur in a plurality of regions, the advertisement place may probably be a cheating advertisement place. Distribution in FIG. 8 also proves this. In a normal advertisement place, abnormal terminals account for a very small percentage. For example, in approximately 2600 to 2700 advertisement places, less than 5% terminals of terminals that hit the advertisement place are abnormal terminals. However, in some advertisement places, the percentage of abnormal terminals exceeds 10%. In approximately 100 advertisement places, 100% terminals of the terminals that hit the advertisement place are abnormal terminals.

Based on the foregoing description, in step 105 to step 107 in this embodiment, the number of abnormal terminals corresponding to the first media information display place and the total number of terminals are collected through statistics in media information display places corresponding to the abnormal terminals. The first media information display place is any of the media information display places corresponding to the abnormal terminals. The first ratio of the number of abnormal terminal to the total number of terminals is calculated. When the first ratio is greater than the second threshold, the first media information display place is marked as a suspected abnormal media information display place.

Based on the suspected abnormal media information display place marked according to the foregoing three methods, that is, the second ratio obtained based on the hit behavior during the day and the night, a first parameter obtained based on distribution of hit positions, and the first ratio obtained based on the abnormal terminal (that is, the user dimension), a second parameter corresponding to an abnormal media information display place is respectively calculated according to a preset weight value. The weight value corresponding to the first parameter may be larger than other weight values. Each parameter is multiplied by its corresponding weight value to obtain a result, and the results are added, to finally obtain the second parameter. It is compared whether the second parameter is greater than the third threshold. When the second parameter is greater than the third threshold, it is determined that the first suspected abnormal media information display place is an abnormal media information display place.

Figure 9:
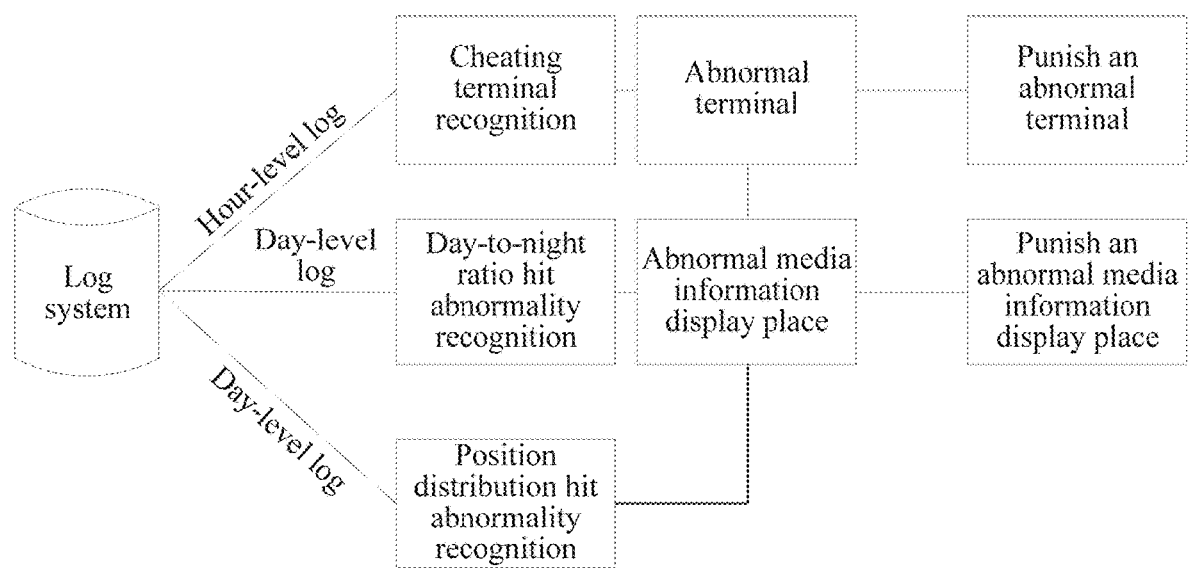
FIG. 9 is a schematic diagram of a processing process of an information processing method according to an embodiment of the present disclosure.

FIG. 9 is a schematic diagram of a processing process of an information processing method according to an embodiment of the present disclosure. As shown in FIG. 9, log information in a log system is obtained, and the obtained log information includes an hour-level log and a day-level log. Specifically, the hour-level log may be, for example, the first log information in this embodiment, and the hour-level log may be, for example, the second log information in this embodiment. On one hand, a cheating terminal is recognized based on the hour-level log, and an abnormal terminal is determined according to the method in Embodiment 1. Further, after the determining that a terminal corresponding to the first terminal information is an abnormal terminal, the method further includes: marking a hit behavior on the media information display place corresponding to the abnormal terminal as invalid, so that the abnormal terminal is published. On the other hand, a cheating media information display place (for example, an advertisement place) is recognized based on the day-level log, an abnormal media information display place is determined according to the method in Embodiment 2. Further, after the determining the first suspected abnormal media information display place as an abnormal media information display place, the method further includes: marking a hit behavior on the abnormal media information display place as invalid, so that the abnormal terminal is published.

By means of the technical solution in this embodiment of the present disclosure, on one hand, the terminal information that performs a hit behavior on the media information display place and corresponding regional information are analyzed, and a terminal whose number of regions is greater than the first threshold is determined as an abnormal terminal. On the other hand, a day-to-night hit rate ratio of the media information display place, and a distribution status of hit positions are analyzed, so as to recognize an abnormal media information display place. In this way, a problem in the existing technology that cheating users cannot be accurately detected and recognized by a technical means for cheating that is displayed in media information is effectively resolved, and a hit rate of the media information display place cannot be accurately collected through statistics in the existing technology, thereby greatly improving the accuracy rate of the hit rate of the media information display place, and protecting the benefits of a media information advertising party (for example, an advertiser).

The information processing method in the embodiments of the present disclosure is described in detail below by using a specific application scenario of advertisement display.

Figure 10:
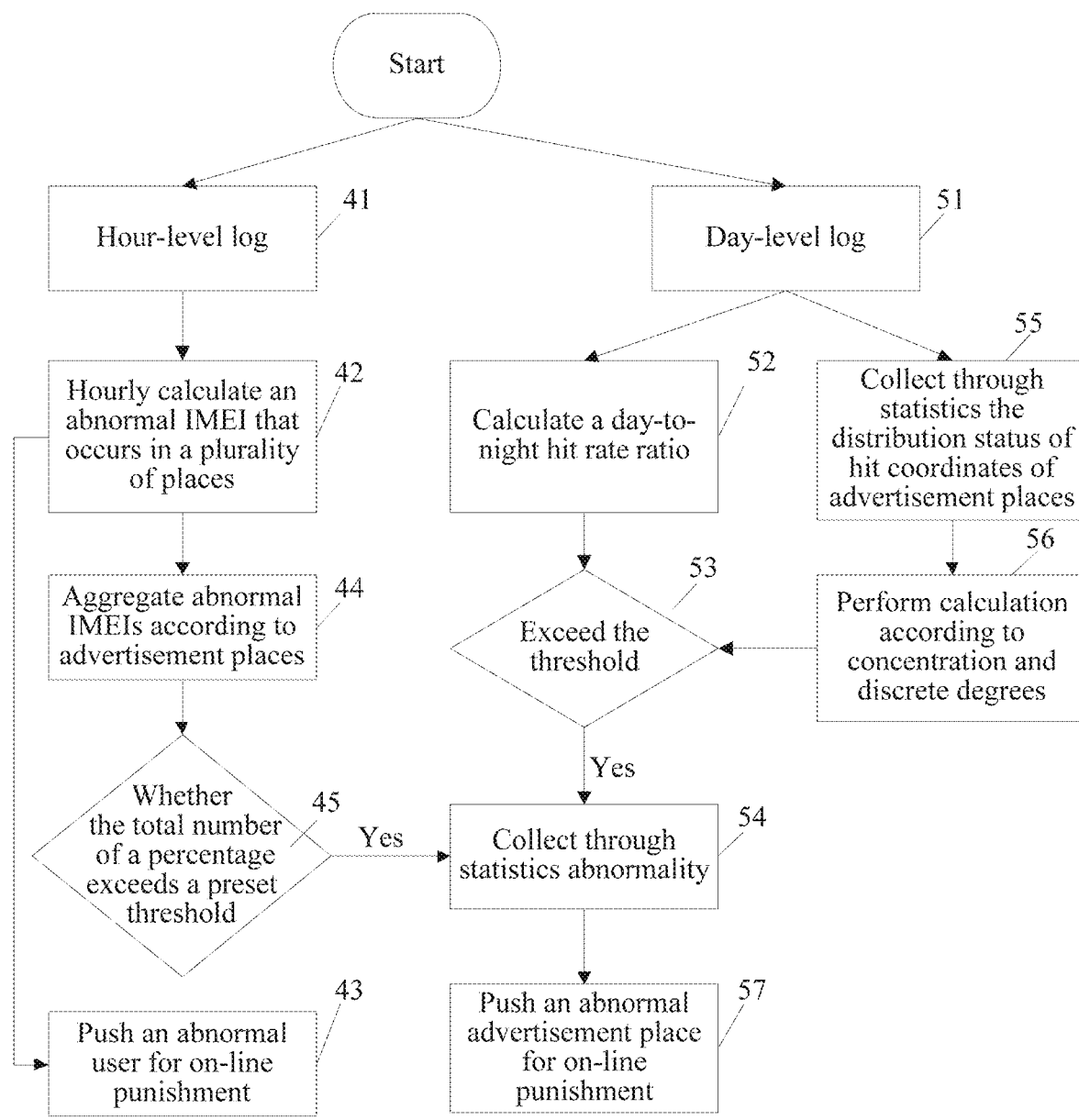
FIG. 10 is a schematic diagram of a processing process of an information processing method in an application scenario according to an embodiment of the present disclosure.

FIG. 10 is a schematic diagram of a processing process of the information processing method in an application scenario according to an embodiment of the present disclosure. As shown in FIG. 10, the information processing solution in this application scenario includes two parts of content: an abnormal user recognition and punishment process which specifically includes step 41 to step 43; and an abnormal advertisement place recognition and punishment process which specifically includes step 51 to step 57, and step 44 and step 45 to step 54. An abnormal user recognition and punishment process specifically includes the following steps:

Step 41: Obtain hour-level log information.

Specifically, the server may set a timer for timing one hour. Each time the timing time of the timer is reached, an IMEI and corresponding address information of a log system in one hour are obtained as the hour-level log information.

Step 42: Hourly calculate an abnormal IMEI that occurs in a plurality of places.

After the hour-level log information is obtained, regional information that is of each IMEI and that occurs in a current range of one hour is collected through statistics. When it is determined that the number of regions that is of each IMEI and that occurs in a range of one hour reaches a preset threshold, it is determined that the IMEI is an abnormal IMEI. The preset threshold may be 3.

Step 43: Push an abnormal user for on-line punishment.

Specifically, when a terminal corresponding to an abnormal IMEI is determined to be an abnormal terminal, it may also be understood that a user corresponding to an abnormal IMEI is determined to be an abnormal user. The pushing an abnormal user for on-line punishment specifically includes: marking a hit behavior corresponding to the abnormal terminal as invalid.

An abnormal advertisement place recognition and punishment process specifically includes at least one of the three parts of content: In the first part of content, a suspected abnormal advertisement place is determined by recognizing a ratio of the hit number of abnormal users in an advertisement place. In the second part of content, a suspected abnormal advertisement place is determined by recognizing a day-to-night hit number ratio. In the third part of content, a suspected abnormal advertisement place is determined by using a distribution status of coordinates hit by an advertisement place. A final abnormal advertisement place is determined by collecting statistics of suspected abnormal advertisement places determined in the foregoing three manners. It specifically includes:

Step 44: Aggregate abnormal IMEIs according to advertisement places, and collect through statistics a hit rate of the advertisement places, the number of abnormal users and the total number of users.

Step 45: Determine whether a percentage of the number of abnormal users in the total number of users exceeds a preset threshold; and when it is determined that the percentage of the number of abnormal users in the total number of users exceeds the preset threshold, determine that the advertisement places are suspected abnormal advertisement places, and push the suspected abnormal advertisement places to step 54 for abnormal advertisement place determining.

Specifically, according to the analysis and description in Embodiment 2, the percentage of abnormal users is very small in normal advertisement place hit; and when the percentage of abnormal users is relatively large in an advertisement place hit, it may be determined that the advertisement place is a suspected abnormal advertisement place.

Step 51: Obtain a day-level log. Specifically, the server may obtain log information of a previous day at a fixed moment each day.

Step 52: Calculate a day-to-night hit rate ratio of each advertisement place based on the obtained day-level log.

Step 53: Determine whether the day-to-night hit rate ratio exceeds a preset threshold; and when it is determined that the day-to-night hit rate ratio exceeds the preset threshold, determine that the advertisement place is a suspected abnormal advertisement place, and send the suspected abnormal advertisement place to step 54 for abnormal advertisement place determining.

Step 55: Collect through statistics the distribution status of hit coordinates of advertisement places based on the obtained day-level log.

Step 56: Calculate parameter indicating a concentration degree and a discrete degree of hit coordinates, and further perform step 54.

Specifically, the calculated parameter indicating a concentration degree and a discrete degree of hit coordinates may be determined by calculating entropy of the hit coordinates of the advertisement places.

Step 53: Determine whether the parameter is greater than a preset threshold; and when it is determined that the parameter is greater than the preset threshold, determine that the advertisement place is a suspected abnormal advertisement place, and send the suspected abnormal advertisement place to step 54 for abnormal advertisement place determining. Certainly, when step 53 is performed herein, the preset threshold for comparison is different from the preset threshold for comparison with the day-to-night hit rate ratio. when it is determined that the parameter is not greater than the preset threshold, determine that the advertisement place is not a suspected abnormal advertisement place.

Step 54: Perform abnormal advertisement place determination according to the suspected abnormal advertisement place determined in the foregoing three manners. Specifically, an abnormal advertisement place preconfiguration may be performed on corresponding weight value for the suspected abnormal advertisement place determined in the foregoing three manners. The suspected abnormal advertisement place determined in the foregoing three manners corresponds to three types of parameters: a second ratio indicating a day-to-night hit rate ratio obtained based on hit behaviors during the day and the night, a first parameter indicating a concentration degree or a discrete degree of hit coordinates obtained based on a distribution status of hit positions, and a first ratio indicating a ratio of the number of abnormal users to the total number of users obtained based on an abnormal terminal (that is, a user dimension). Each parameter is multiplied by a corresponding weight value, and the results are added, to obtain a final result. When the final result is greater than a preset threshold, it may be determined that the suspected abnormal advertisement place is an abnormal advertisement place. When the final result is not greater than a preset threshold, it may be determined that the suspected abnormal advertisement place is not an abnormal advertisement place.

Step 57: Push an abnormal advertisement place for on-line punishment.

Specifically, the pushing an abnormal advertisement place for on-line punishment specifically includes: marking a hit behavior corresponding to the abnormal advertisement place as invalid.

Embodiment 3

Figure 11:
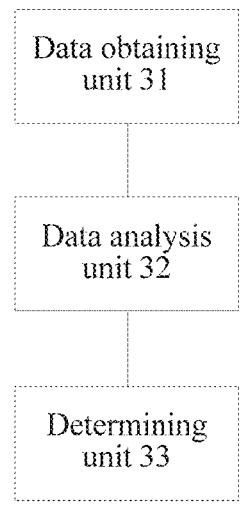
FIG. 11 is a schematic structural diagram of a first component of a server according to an embodiment of the present disclosure.

Based on Embodiment 1, this embodiment of the present disclosure further provides a server. FIG. 11 is a schematic diagram of a first component structure of the server according to this embodiment of the present disclosure. As shown in FIG. 11, the server includes: a data obtaining unit 31, a data analysis unit 32, and a determining unit 33.

The data obtaining unit 31 is configured to obtain first log information in a first time period.

The data analysis unit 32 is configured to obtain, based on the first log information, terminal information of a terminal that performs a hit behavior on a media information display place; determine, based on the terminal information, regional information corresponding to the terminal, the regional information being used to indicate a region in which the terminal is located; and determine whether the number of regions in which the terminal is located is greater than a first threshold in a preset time range.

The determining unit 33 is configured to obtain, based on a determining result obtained by the data analysis unit 32, first terminal information of which the corresponding number of regions is greater than the first threshold, and determine that a terminal corresponding to the first terminal information is an abnormal terminal.

In this embodiment, the first log information is log information in a relatively short time range. In an implementation, the first log information may be hour-level log information, for example, one-hour log information. Certainly, the first log information is not limited to the hour-level log information, and may be minute-level log information. The first log information includes all information obtained by a media information pushing platform, which includes a hit behavior on a media information display place, terminal information, user information, and regional information about a location where a terminal is located.

In this embodiment, based on the specific description of Embodiment 1, the data analysis unit 32 obtains the terminal information in the media information promotion platform and corresponding regional information. The regional information may be specifically represented by a municipal-level regional range. When the number of regions corresponding to the first terminal information in a time range less than a preset time range (for example, one hour) is greater than the first threshold, the determining unit 33 may determine that a first terminal corresponding to the first terminal information is an abnormal terminal. The first threshold may be 3.

In an implementation, the server further includes a first punishment unit 35, configured to: after the determining unit 33 determines that the terminal corresponding to the first terminal information is an abnormal terminal, mark a hit behavior on the media information display place corresponding to the abnormal terminal as invalid.

A person skilled in the art should understand that, functions of all processing units in the servers in the embodiments of the present disclosure may be understood by referring to the related description of the foregoing information processing method, and all processing units in the servers in the embodiments of the present disclosure may be implemented by using an analog circuit for implementing the functions in the embodiments of the present disclosure, or may be implemented by running software for executing the functions in the embodiments of the present disclosure on an intelligent terminal.

Embodiment 4

Figure 12:
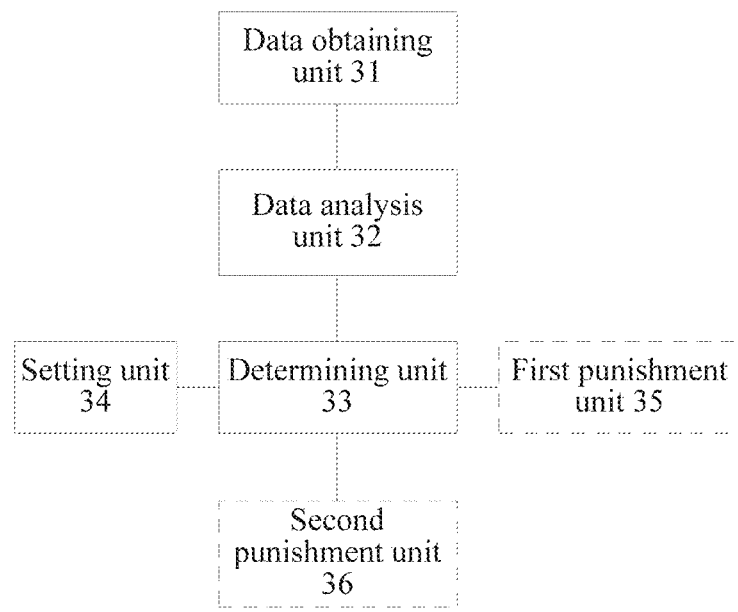
FIG. 12 is a schematic diagram of a second component structure of a server according to an embodiment of the present disclosure.

Based on the Embodiment 2, this embodiment of the present disclosure further provides a server. FIG. 12 is a schematic diagram of a second component structure of the server according to this embodiment of the present disclosure. As shown in FIG. 12, the server includes: a data obtaining unit 31, a data analysis unit 32, a determining unit 33, and a setting unit 34.

The data obtaining unit 31 is configured to obtain first log information in a first time period.

The data analysis unit 32 is configured to obtain, based on the first log information obtained by the data obtaining unit 31, terminal information of a terminal that performs a hit behavior on a media information display place; determine, based on the terminal information, regional information corresponding to the terminal, the regional information being used to indicate a region in which the terminal is located; and determine whether the number of regions in which the terminal is located is greater than a first threshold in a preset time range. The data analysis unit 32 is further configured to collect through statistics the number of abnormal terminals corresponding to first media information display place and the total number of terminals in the media information display place corresponding to the abnormal terminal, where the first media information display place is any of the media information display place corresponding to the abnormal terminal; and calculate a first ratio of the number of abnormal terminals to the total number of terminals.

The determining unit 33 is configured to: obtain, based on a determining result obtained by the data analysis unit 32, first terminal information of which the corresponding number of regions is greater than the first threshold, and determine that a terminal corresponding to the first terminal information is an abnormal terminal; and is further configured to mark the first media information display place as a suspected abnormal media information display place when the first ratio is greater than a second threshold.

The data obtaining unit 31 is further configured to obtain second log information in a second time period, where a time range of the second time period may be greater than a time range of the first time period.

The data analysis unit 32 is further configured to: obtain, based on the second log information, a first hit rate of a second media information display place in a first preset time range and a second hit rate of the second media information display place in a second preset time range, where the first preset time range and the second preset time range are different; and calculate a second ratio of the first hit rate to the second hit rate. The data analysis unit 32 is further configured to: obtain, based on the second log information, information about hit positions on a third media information display place; calculate a first parameter according to the information about hit positions, where the first parameter indicates a distribution status of the hit positions on the third media information display place; and determine whether the first parameter falls within a preset threshold range.

The determining unit 33 is further configured to, when the second ratio is greater than the second threshold, determine the second media information display place as a suspected abnormal media information display place. When the first parameter does not fall within the preset threshold range, the determining unit 33 is further configured to determine that the third media information display place is a suspected abnormal media information display place. When the second ratio is not greater than the second threshold, the determining unit 33 is configured to determine that the second media information display place is not a suspected abnormal media information display place. When the first parameter falls within the preset threshold range, the determining unit 33 is further configured to determine that the third media information display place is not a suspected abnormal media information display place.

The setting unit 34 is configured to set a weight value for the first ratio, the second ratio, and the first parameter, respectively.

The determining unit 33 is further configured to: perform calculation according to the weight value corresponding to each of the first ratio, the second ratio, and the first parameter, to obtain a second parameter corresponding to the suspected abnormal media information display place; and determine that the suspected abnormal media information display place is an abnormal media information display place when the second parameter is greater than a third threshold.

In this embodiment, the data obtaining unit 31 obtains the first log information and the second log information. The first log information may be log information in a relatively short time range. In an implementation, the first log information may be hour-level log information, for example, one-hour log information. Certainly, the first log information is not limited to hour-level log information and may be minute-level log information. A time range of the second log information is greater than a time range of the first log information. Relative to the first log information, the second log information has a relatively longer time range. In an implementation, the second log information may be day-level log information. Certainly, the second log information is not limited to log information in a range of one day, for example, the second log information may be log information in a range of ten days.

Based on the description of Embodiment 2, the data analysis unit 32 analyzes, based on the second log information, the first hit rate (for example, a hit rate during the day) of the media information display place in the first preset time range and the second hit rate (for example, a hit rate during the night) of the media information display place in the second preset time range, and calculate a ratio of the hit rate during the day to the hit rate during the night. When the ratio is less than the second threshold, the determining unit 33 is further configured to determine the corresponding media information display place as a suspected abnormal media information display place. When the ratio is not less than the second threshold, the determining unit 33 is further configured to determine that the corresponding media information display place is not a suspected abnormal media information display place.

The data analysis unit 32 analyzes, based on the second log information, information about hit positions on the media information display place, and calculates the first parameter (for example, entropy) based on the information about hit positions on the media information display place. The determining unit 33 is further configured to determine that the third media information display place is a suspected abnormal media information display place when the first parameter (for example, the entropy) does not fall within the preset threshold range.

In a third aspect, the data analysis unit 32 analyzes the media information display place related to the abnormal terminal for the abnormal terminal determined by the determining unit 33, and calculates a ratio of the number of abnormal terminals in the media information display place to the total number of terminals. When the ratio is greater than the second threshold, the determining unit 33 marks the first media information display place as a suspected abnormal media information display place. When the ratio is not greater than the second threshold, the determining unit 33 determine the first media information display place is not a suspected abnormal media information display place.

With reference to the foregoing embodiments, the determining unit 33 calculates, based on the weight value set by the setting unit 34, a second parameter corresponding to the abnormal media information display place. The weight value corresponding to the first parameter may be relatively large; and each parameter is multiplied by the corresponding weight value and the results are added together to obtain the second parameter. It is determined whether the second parameter is greater than the third threshold. When the second parameter is greater than the third threshold, it is determined that the first suspected abnormal media information display place is an abnormal media information display place. When the second parameter is not greater than the third threshold, it is determined that the first suspected abnormal media information display place is not an abnormal media information display place.

In an implementation, the server further includes a first punishment unit 35, configured to, after the determining unit 33 determines that the terminal corresponding to the first terminal information is an abnormal terminal, mark a hit behavior on the media information display place corresponding to the abnormal terminal as invalid.

In another embodiment, the server further includes a second punishment unit 36, configured to: after the determining unit 33 determines that the suspected abnormal media information display place is an abnormal media information display place, mark a hit behavior on the abnormal media information display place as invalid.

A person skilled in the art should understand that, functions of all processing units in the servers in the embodiments of the present disclosure may be understood by referring to the related description of the foregoing information processing method, and all processing units in the servers in the embodiments of the present disclosure may be implemented by using an analog circuit for implementing the functions in the embodiments of the present disclosure, or may be implemented by running software for executing the functions in the embodiments of the present disclosure on an intelligent terminal.

In Embodiment 3 and Embodiment 4 of the present disclosure, the data obtaining unit 31, the data analysis unit 32, the determining unit 33, the setting unit 34, the first punishment unit 35, and the second punishment unit 36 in the server all may be implemented by using a central processing unit (CPU), a digital signal processor (DSP), a microcontroller unit (MCU), or a field programmable gate array (FPGA) in the server during actual application.

Figure 13:
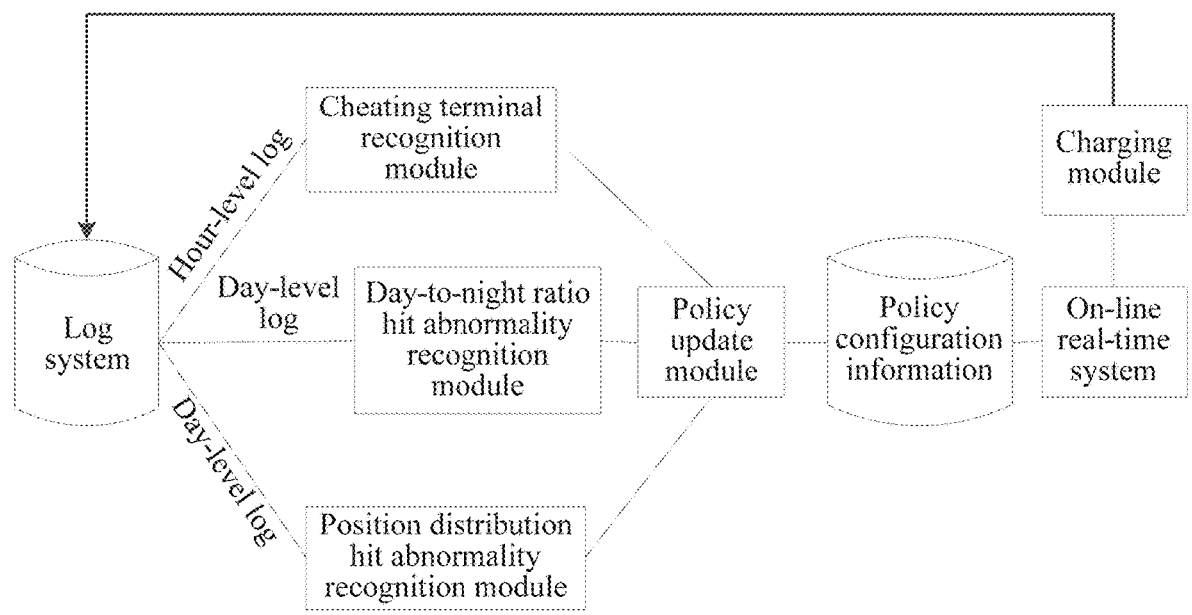
FIG. 13 is schematic diagram of a specific modular structure of a server according to an embodiment of the present disclosure.

FIG. 13 is a schematic diagram of a specific modular structure of a server according to an embodiment of the present disclosure. As shown in FIG. 13, log information is obtained by using a cheating terminal recognition module and a day-to-night ratio hit abnormality recognition module, a position distribution hit abnormality recognition module. The cheating terminal recognition module obtains hour-level log information. The day-to-night ratio hit abnormality recognition module and the position distribution hit abnormality recognition module respectively obtain day-level log information. A policy update module is configured with a cheating determining policy according to policy configuration information. The cheating terminal recognition module, the day-to-night ratio hit abnormality recognition module and the position distribution hit abnormality recognition module perform analysis and recognition according to the cheating determining policy in the policy update module. The policy update module obtains an abnormal terminal and an abnormal media information display place (for example, an abnormal advertisement place). After an on-line real-time system receives a request from a charging module, the on-line real-time system gives a punishment according to an obtained determining result, and marks a hit behavior on an abnormal terminal as invalid and marks a hit behavior on an abnormal media information display place as invalid. Meanwhile, a charging module does not charge the hit behavior recorded which are marked as invalid.

Figure 14:
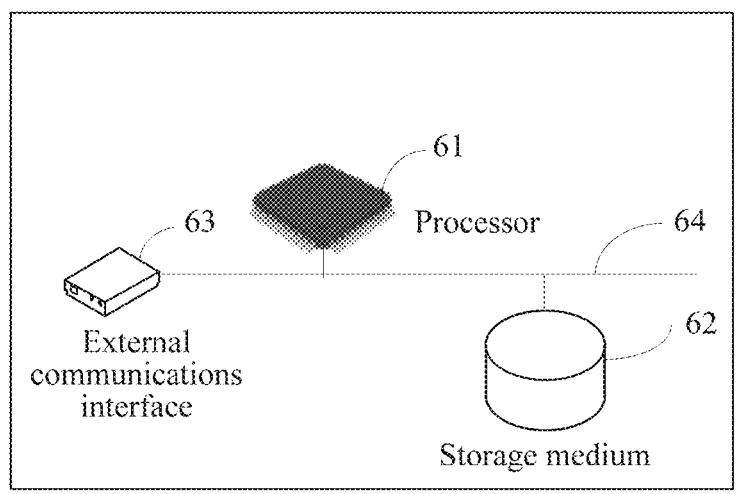
FIG. 14 is a diagram of an example in which a server is used as a hardware entity according to an embodiment of the present disclosure.

In the embodiments, an example in which a server is used as a hardware entity is shown in FIG. 14. The server includes a processor 61, a storage medium 62, and at least one external communications interface 63. The processor 61, the storage medium 62, and the external communications interface 63 are connected to each other by using a bus 64.

It needs to be pointed out that, the foregoing description related to the server is similar to the description of the method. Description of beneficial effects of the same method is not described herein again. For technical details that are not disclosed in the server embodiments of the present disclosure, refer to the description of the method embodiments of the present disclosure.

In the several embodiments provided in the present application, it should be understood that the disclosed apparatus and method may be implemented in other manners. The described device embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in a same place, or may be distributed to many network units. Some or all of the units need to be selected according to actual requirements to implement the purpose of the solution of the embodiments.

In addition, functional units in the embodiments of the present disclosure may be all integrated in a second processing unit, each unit is separately used as a unit, or two or more units are integrated in a unit. The integrated unit may be implemented in a form of hardware, or may be implemented in form of hardware plus a software functional unit.

A person of ordinary skill in the art may understand that, some or all of steps for implementing the method embodiments may be implemented by using hardware related to a program instruction. The program may be stored in a computer readable storage medium. When the program is executed, the steps including the method embodiments are performed. However, the storage medium includes various types of media that may store program code, for example, a mobile storage device, a read-only memory (ROM), a random access memory (RAM), a magnetic disk, or an optical disk.

Alternatively, in the present disclosure, when implemented in the form of software functional modules and sold or used as independent products, the integrated modules may be stored in a computer-readable storage medium. Based on such an understanding, the technical solutions of the embodiments of the present disclosure essentially, or the part contributing to the prior art may be implemented in a form of a software product. The computer software product is stored in a storage medium and includes several instructions for instructing a computer device (which may be a personal computer, a server, a network device, or the like) to perform all or some of the methods described in the embodiments of the present disclosure. The foregoing storage medium includes: any media that can store program code, such as a removable storage device, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for identifying an abnormal terminal and an abnormal media information display place, the method comprising:
   obtaining, by a device comprising a memory and a processor in communication with the memory, first log information of a media information advertising system in a first time period;
   obtaining, by the device based on the first log information, terminal information of a terminal that performs a hit behavior on a media information display place;
   determining, by the device based on the terminal information, regional information corresponding to the terminal, wherein the regional information is used to indicate at least one region in which the terminal is located;
   determining, by the device, whether a number of regions is greater than a first threshold in a preset time range, wherein the preset time range is shorter than the first time period;
   in response to determining that the number of regions is greater than the first threshold in the preset time range:
   determining, by the device, that the terminal is an abnormal terminal;
   collecting, by the device based on determining the abnormal terminal and through statistics, a number of abnormal terminals and a total number of terminals corresponding to a first media information display place;
   dividing, by the device, the number of abnormal terminals by the total number of terminals to obtain a first ratio, the total number of terminals comprising the abnormal terminals and normal terminals, and the first ratio being in a range of 0 and 1, inclusive;
   determining, by the device, whether the first ratio is greater than a second threshold; and
   in response to determining that the first ratio is greater than the second threshold, identifying, by the device, the first media information display place as an abnormal media information display place, and punishing the abnormal media information display place by invalidating a hit behavior corresponding to the abnormal media information display place.

2. The method according to claim 1, further comprising:
   obtaining, by the device, second log information in a second time period, wherein a time range of the second time period is greater than a time range of the first time period;
   obtaining, by the device based on the second log information, a first hit rate of a second media information display place in a first preset time range and a second hit rate of the second media information display place in a second preset time range, wherein the first preset time range and the second preset time range are different;
   calculating, by the device, a second ratio of the first hit rate to the second hit rate;
   determining, by the device, whether the second ratio is less than the second threshold; and
   when it is determined that the second ratio is less than the second threshold, determining, by the device, the second media information display place as a suspected abnormal media information display place.

3. The method according to claim 2, wherein after the obtaining the second log information in the second time period, the method further comprises:
   obtaining, by the device based on the second log information, information about hit positions on a third media information display place;
   calculating, by the device, a first parameter according to the information about the hit positions, wherein the first parameter indicates a distribution status of the hit positions on the third media information display place;
   determining, by the device, whether the first parameter falls within a preset threshold range; and
   when it is determined that the first parameter does not fall within the preset threshold range, determining, by the device, that the third media information display place is a suspected abnormal media information display place.

4. The method according to claim 3, further comprising:
   setting, by the device, a weight value for each of the first ratio, the second ratio, and the first parameter;
   calculating, by the device according to the weight value for each of the first ratio, the second ratio, and the first parameter, a second parameter corresponding to the suspected abnormal media information display place;
   determining, by the device, whether the second parameter is greater than a third threshold; and
   when it is determined that the second parameter is greater than the third threshold, determining, by the device, that the suspected abnormal media information display place is an abnormal media information display place.

5. The method according to claim 4, wherein, when it is determined that the second parameter is greater than the third threshold, after the determining, by the device, that the suspected abnormal media information display place is the abnormal media information display place, the method further comprises:
   determining, by the device, a hit behavior on the abnormal media information display place as invalid.

6. The method according to claim 1, wherein, when it is determined that the number of regions is greater than the first threshold in the preset time range, after determining, by the device, that the terminal is the abnormal terminal, the method further comprises:
   determining, by the device, a hit behavior on the media information display place corresponding to the abnormal terminal as invalid.

7. A server for identifying an abnormal terminal and an abnormal media information display place, the server comprising:
   a memory storing instructions; and
   a processor in communicating with the memory, wherein, when the processor executes the instructions, the instructions are configured to cause the server to:
      obtain first log information of a media information advertising system in a first time period,
      obtain, based on the first log information, terminal information of a terminal that performs a hit behavior on a media information display place,
      determine, based on the terminal information, regional information corresponding to the terminal, wherein the regional information is used to indicate at least one region in which the terminal is located,
      determine whether a number of regions is greater than a first threshold in a preset time range, wherein the preset time range is shorter than the first time period,
      in response to determining that the number of regions is greater than the first threshold in the preset time range:
         determine that the terminal is an abnormal terminal,
         collect, based on determining the abnormal terminal through statistics, a number of abnormal terminals and a total number of terminals corresponding to a first media information display place,
      divide the number of abnormal terminals by the total number of terminals to obtain a first ratio, the total number of terminals comprising the abnormal terminals and normal terminals, and the first ratio being in a range of 0 and 1, inclusive,
      determine whether the first ratio is greater than a second threshold, and
      in response to determining that the first ratio is greater than the second threshold, identify the first media information display place as an abnormal media information display place, and punishing the abnormal media information display place by invalidate a hit behavior corresponding to the abnormal media information display place.

8. The server according to claim 7, wherein, when the processor executes the instructions, the instructions are further configured to cause the server to:
   obtain second log information in a second time period, wherein a time range of the second time period is greater than a time range of the first time period;
   obtain, based on the second log information, a first hit rate of a second media information display place in a first preset time range and a second hit rate of the second media information display place in a second preset time range, wherein the first preset time range and the second preset time range are different;
   calculate a second ratio of the first hit rate to the second hit rate;
   determine whether the second ratio is less than the second threshold; and
   when it is determined that the second ratio is less than the second threshold, determine the second media information display place as a suspected abnormal media information display place.

9. The server according to claim 8, wherein after the instructions are configured to cause the server to obtain the second log information in the second time period, the instructions are further configured to cause the server to:
   obtain, based on the second log information, information about hit positions on a third media information display place;
   calculate a first parameter according to the information about the hit positions, wherein the first parameter indicates a distribution status of the hit positions on the third media information display place;
   determine whether the first parameter falls within a preset threshold range; and
   when it is determined that the first parameter does not fall within the preset threshold range, determine that the third media information display place is a suspected abnormal media information display place.

10. The server according to claim 9, wherein, when the processor executes the instructions, the instructions are further configured to cause the server to:
    set a weight value for each of the first ratio, the second ratio, and the first parameter;
    calculate, according to the weight value for each of the first ratio, the second ratio, and the first parameter, a second parameter corresponding to the suspected abnormal media information display place;
    determine whether the second parameter is greater than a third threshold; and
    when it is determined that the second parameter is greater than the third threshold, determine that the suspected abnormal media information display place is an abnormal media information display place.

11. The server according to claim 10, wherein, when it is determined that the second parameter is greater than the third threshold, after the instructions are configured to cause the server to determine that the suspected abnormal media information display place is the abnormal media information display place, the instructions are further configured to cause the server to:
    determine a hit behavior on the abnormal media information display place as invalid.

12. The server according to claim 7, wherein, when it is determined that the number of regions is greater than the first threshold in the preset time range, after the instructions are configured to cause the server to determine that the terminal is the abnormal terminal, the instructions are further configured to cause the server to:
    determine a hit behavior on the media information display place corresponding to the abnormal terminal as invalid.

13. A non-transitory computer readable storage medium storing instructions, wherein the instructions, when executed by a processor, cause the processor to perform:
    obtaining first log information of a media information advertising system in a first time period;

obtaining, based on the first log information, terminal information of a terminal that performs a hit behavior on a media information display place;

determining, based on the terminal information, regional information corresponding to the terminal, wherein the regional information is used to indicate at least one region in which the terminal is located;

determining whether a number of regions is greater than a first threshold in a preset time range, wherein the preset time range is shorter than the first time period;

in response to determining that the number of regions is greater than the first threshold in the preset time range: determining that the terminal is an abnormal terminal;

collecting, based on determining the abnormal terminal through statistics, a number of abnormal terminals and a total number of terminals corresponding to a first media information display place;

dividing, the number of abnormal terminals by the total number of terminals to obtain a first ratio, the total number of terminals comprising the abnormal terminals and normal terminals, and the first ratio being in a range of 0 and 1, inclusive;

determining whether the first ratio is greater than a second threshold; and in response to determining that the first ratio is greater than the second threshold, identifying the first media information display place as an abnormal media information display place, and punishing the abnormal media information display place by invalidating a hit behavior corresponding to the abnormal media information display place.

14. The non-transitory computer readable storage medium according to claim 13 wherein the instructions, when executed by the processor, further cause the processor to perform:

obtaining second log information in a second time period, wherein a time range of the second time period is greater than a time range of the first time period;

obtaining, based on the second log information, a first hit rate of a second media information display place in a first preset time range and a second hit rate of the second media information display place in a second preset time range, wherein the first preset time range and the second preset time range are different;

calculating a second ratio of the first hit rate to the second hit rate;

determining whether the second ratio is less than the second threshold; and when it is determined that the second ratio is less than the second threshold, determining the second media information display place as a suspected abnormal media information display place.

15. The non-transitory computer readable storage medium according to claim 14, wherein, after the instructions cause the processor to perform the obtaining the second log information in the second time period, the instructions further cause the processor to perform:

obtaining, based on the second log information, information about hit positions on a third media information display place;

calculating a first parameter according to the information about the hit positions, wherein the first parameter indicates a distribution status of the hit positions on the third media information display place;

determining whether the first parameter falls within a preset threshold range; and when it is determined that the first parameter does not fall within the preset threshold range, determining that the third media information display place is a suspected abnormal media information display place.

16. The non-transitory computer readable storage medium according to claim 15, wherein the instructions, when executed by the processor, further cause the processor to perform:

setting a weight value for each of the first ratio, the second ratio, and the first parameter;

calculating, according to the weight value for each of the first ratio, the second ratio, and the first parameter, a second parameter corresponding to the suspected abnormal media information display place;

determining whether the second parameter is greater than a third threshold; and when it is determined that the second parameter is greater than the third threshold, determining that the suspected abnormal media information display place is an abnormal media information display place.

17. The non-transitory computer readable storage medium according to claim 13, wherein, when it is determined that the number of regions is greater than the first threshold in the preset time range, after the instructions cause the processor to perform the determining that the terminal is the abnormal terminal, the instructions further cause the processor to perform:

determining a hit behavior on the media information display place corresponding to the abnormal terminal as invalid.

* * * * *